US012673598B2

(12) United States Patent
Choe et al.

(10) Patent No.: US 12,673,598 B2
(45) Date of Patent: Jul. 7, 2026

(54) SEATBACK RESTRAINT DEVICE FOR VEHICLE

(71) Applicants:Hyundai Motor Company, Seoul (KR); Kia Corporation, Seoul (KR); Daewon Precision Industrial Co., Ltd., Ansan (KR)

(72) Inventors: Seung Chan Choe, Hwaesong (KR); Hong Sik Chang, Hwaesong (KR); Hyun Ko, Suwon (KR); Jung Sang You, Hwaesong (KR); Hyo Cheol Kang, Suwon (KR); Yeong Hoon Seo, Hwaesong (KR); Yun Ho Shin, Cheonan (KR); Jae Won Sim, Hwaesong (KR)

(73) Assignees: Hyundai Motor Company, Seoul (KR); Kia Corporation, Seoul (KR); Daewon Precision Industrial Co., Ltd., Ansan (KR)

( * ) Notice: Subject to any disclaimer, the term of this patent is extended or adjusted under 35 U.S.C. 154(b) by 197 days.

(21) Appl. No.: 18/620,784

(22) Filed: Mar. 28, 2024

(65) Prior Publication Data

US 2024/0367569 A1      Nov. 7, 2024

(30) Foreign Application Priority Data

May 4, 2023      (KR) ........................ 10-2023-0058466

(51) Int. Cl.
*B60N 2/90* (2018.01)
*B60N 2/02* (2006.01)

(52) U.S. Cl.
CPC ............... *B60N 2/933* (2018.02); *B60N 2/02* (2013.01); *B60N 2002/971* (2018.02)

(58) Field of Classification Search
CPC ............................ B60N 2/366; B60N 2/2245
See application file for complete search history.

(56) References Cited

FOREIGN PATENT DOCUMENTS

| | | | | | |
|---|---|---|---|---|---|
| DE | 19707995 A1 | * | 9/1998 | ........... | B60N 2/2245 |
| DE | 102017125432 A1 | * | 5/2019 | ............ | B60N 2/366 |
| KR | 0131626 Y1 | * | 9/1994 | ............ | B60N 2/366 |
| KR | 20030003480 A | | 1/2003 | | |
| KR | 10-0461100 B1 | | 12/2004 | | |
| KR | 10-1356136 B1 | | 1/2014 | | |
| KR | 10-1447586 B1 | | 10/2014 | | |

* cited by examiner

*Primary Examiner* — Timothy D Collins
*Assistant Examiner* — Terri L Filosi
(74) *Attorney, Agent, or Firm* — Fox Rothschild LLP

(57) ABSTRACT

A seatback restraint device for a vehicle allows a seatback to be freely restrained by and released from a striker by rotation and a scissoring operation of first and second latches. The first latch and the second latch are connected to be rotated and operated in a scissoring motion about a main hinge, one side of the first latch and one side of the second latch are connected to each other by a first elastic body, and other sides of the first and second latches are connected to each other by an operating cable, so that the striker inserted into first and second latch recesses is restrained by the scissoring operation of the first and second latches due to elastic force of the first elastic body, and restraint of the striker is released through mutual operation of the first latch or the second latch by pulling the operating cable.

20 Claims, 17 Drawing Sheets

SEATBACK RESTRAINT DEVICE FOR VEHICLE

CROSS-REFERENCE TO RELATED APPLICATION

This application claims under 35 U.S.C. § 119(a) the benefit of Korean Patent Application No. 10-2023-0058466 filed on May 4, 2023, the entire contents of which are incorporated herein by reference.

BACKGROUND

(a) Technical Field

The present disclosure relates to a seatback restraint device for a vehicle, more particularly, to the seatback restraint device which allows a seat to be slid in a state in which a seatback is restrained by a striker fixed to a vehicle body.

(b) Description of the Related Art

In general, rear seats of trucks, passenger cars, and vans include folding seats in which seatbacks are folded, so as to secure cargo loading spaces, and these folding seats are divided into a free hinge type, and a reclining type.

A reclining-type folding seat is configured such that a seatback is folded while adjusting an angle of the seatback by a recliner, but the reclining-type folding seat has a complicated structure and high installation costs, and thus is typically applied only to driver's seats and front passenger seats but is rarely applied to rear seats of vehicles.

A free hinge-type folding seat is configured such that, when a center back folding knob is pulled or pressed, a latch is released from a striker, and when a user pulls a seatback forwards, the seatback is folded towards a seat cushion using a hinge connecting the seatback to the seat cushion as a pivot point, thereby having a simple structure and reduced installation costs compared to the reclining-type folding seat.

However, in the free hinge-type folding seat, restraint (locking) of the latch by the striker installed on the vehicle body is constant, and thus, when the position of the seat is changed, i.e., when the position of the seat is changed along a seat track, restraint (locking) of the striker by the latch may not be achieved.

Further, in the free hinge-type folding seat, because restraint (locking) of the latch by the striker is achieved only when the inclination angle of the seatback is kept constant, the inclination angle of the seatback may not be adjusted, which may result in problems such as increase in discomfort felt by passengers when riding for a long period of time.

The above information disclosed in this Background section is only for enhancement of understanding of the background of the disclosure and therefore it may contain information that does not form the prior art that is already known in this country to a person of ordinary skill in the art.

SUMMARY

The present disclosure provides a seatback restraint device for a vehicle which allows a seatback to be freely restrained by and released from a striker by rotation and scissoring operation of first and second latches about a main hinge without a separate fixing unit configured to restrain the first and second latches.

It is another object of the present disclosure to provide a seatback restraint device for a vehicle which allows a cushion frame to be moved by a seat sliding device in the state in which a seatback is restrained by a striker fixed to a vehicle body.

It is yet another object of the present disclosure to provide a seatback restraint device for a vehicle which allows a seatback to be freely restrained by and released from a striker regardless of change in the position of a seat.

In one aspect, the present disclosure provides a seatback restraint device for a vehicle including a first latch provided with a first latch recess configured such that a striker of a vehicle body is inserted thereinto, a second latch provided with a second latch recess configured such that the striker of the vehicle body is inserted thereinto, a main hinge configured to penetrate the first and second latches and to be connected to a fixing bracket so as to enable rotation and a scissoring operation of the first latch and the second latch, a first elastic body having both ends connected to and supported by one end of the first latch and one end of the second latch, and an operating cable connected to and supported by the first latch and the second latch, wherein the first and second latches are mutually operated by the operating cable. A vehicle seat may include the seatback restraint device.

A vehicle may include the seatback restraint device.

In another aspect, the present disclosure provides seatback restraint device for a vehicle, comprising: a first latch provided with a first latch recess, wherein a striker of a vehicle body is configured to be inserted into the first latch recess; a second latch provided with a second latch recess, wherein the striker is configured to be inserted into the second latch recess; a main hinge configured to penetrate the first and second latches so as to enable rotation and a scissoring operation of the first latch and the second latch; and an operating cable connected to and supported by the first latch and the second latch, wherein the first and second latches are mutually operated by the operating cable, wherein the second latch recess of the second latch is formed so that one side of the second latch recess is open toward the striker when a seatback frame is rotated in a direction of the striker, and wherein the first latch recess of the first latch is formed so that one side of the first latch recess is open in a direction perpendicular to an opening direction of the second latch.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
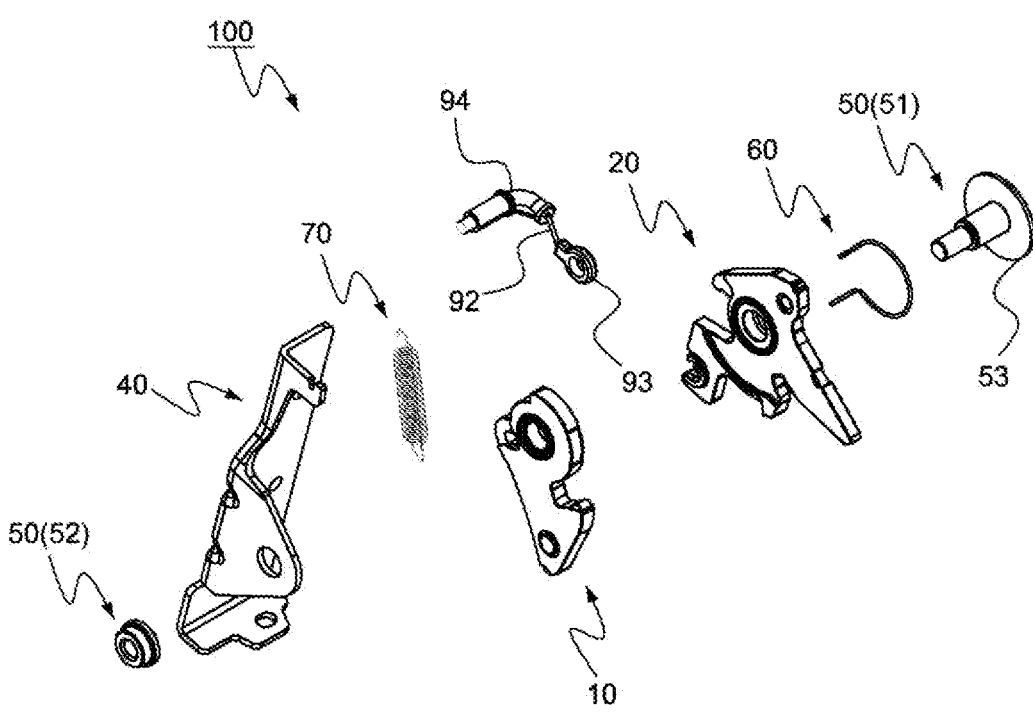
FIG. 1 is an exemplary exploded view showing the configuration of a seatback restraint device for a vehicle according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 2:
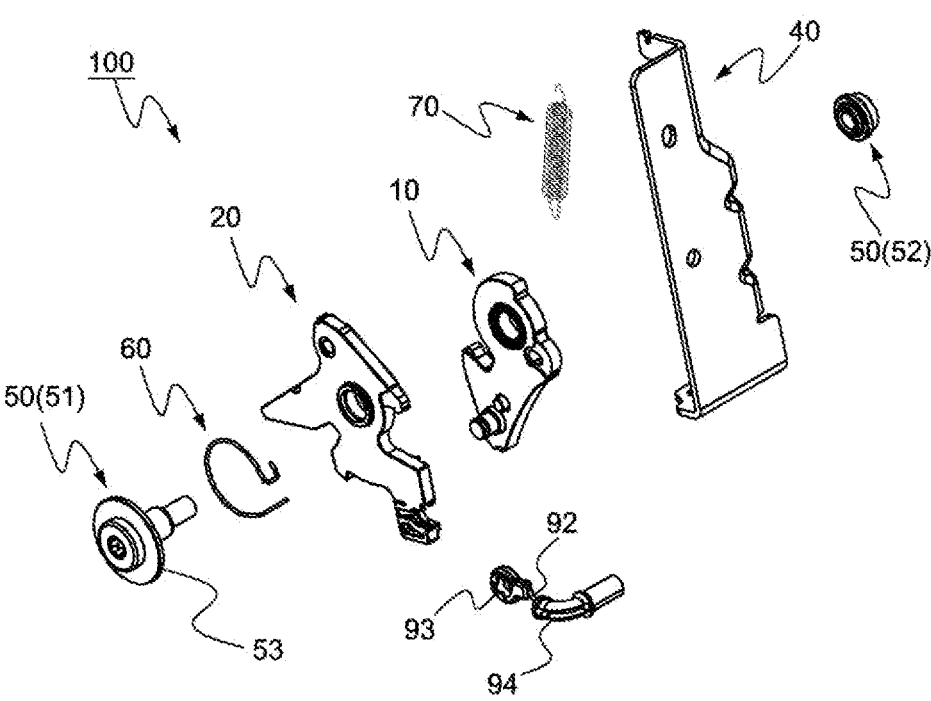
FIG. 2 is another exemplary exploded view showing the configuration of the seatback restraint device according to the present disclosure.
Figure 3:
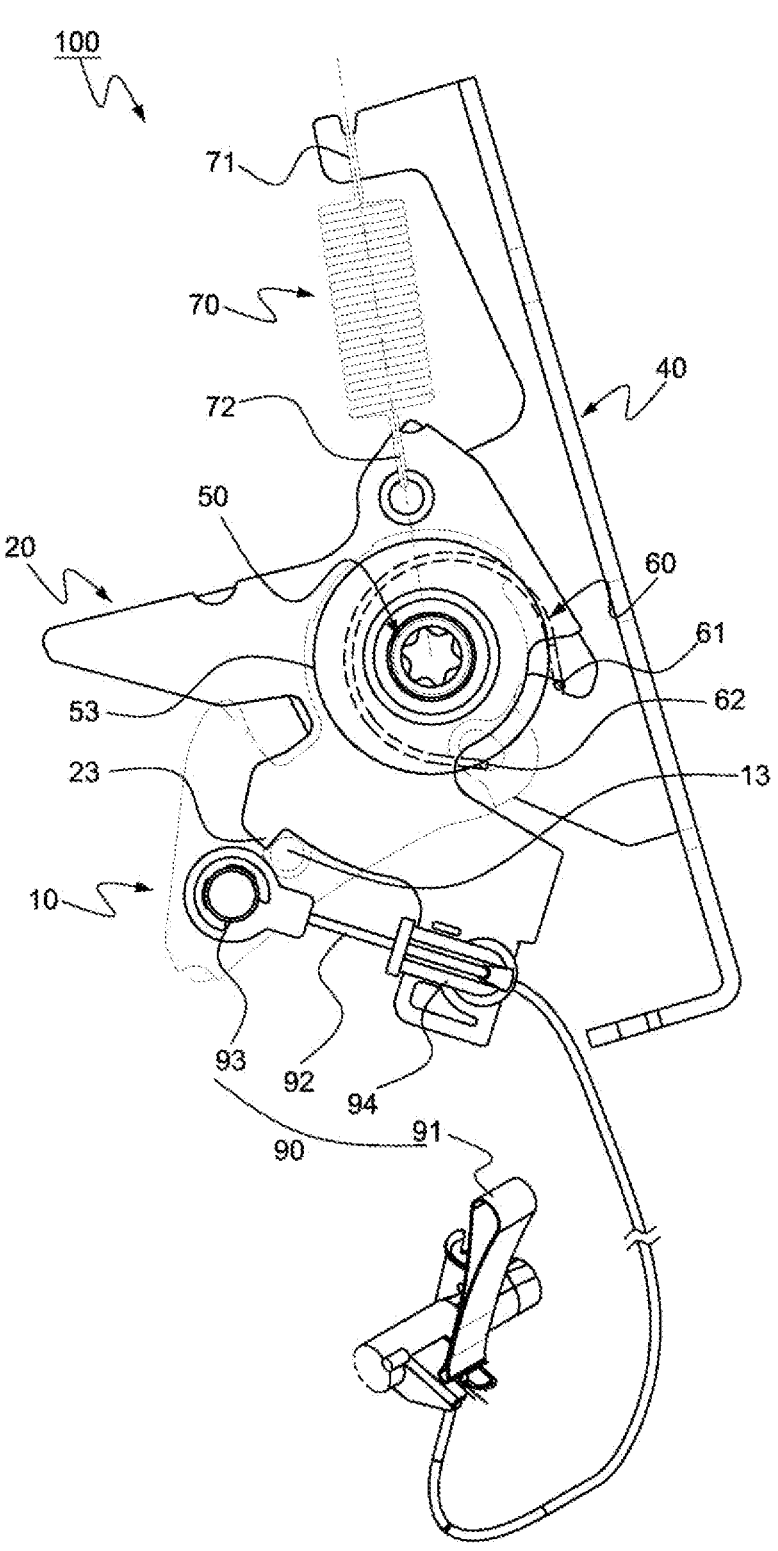
FIG. 3 is a view showing an assembled configuration of the seatback restraint device according to the present disclosure.
Figure 4A:
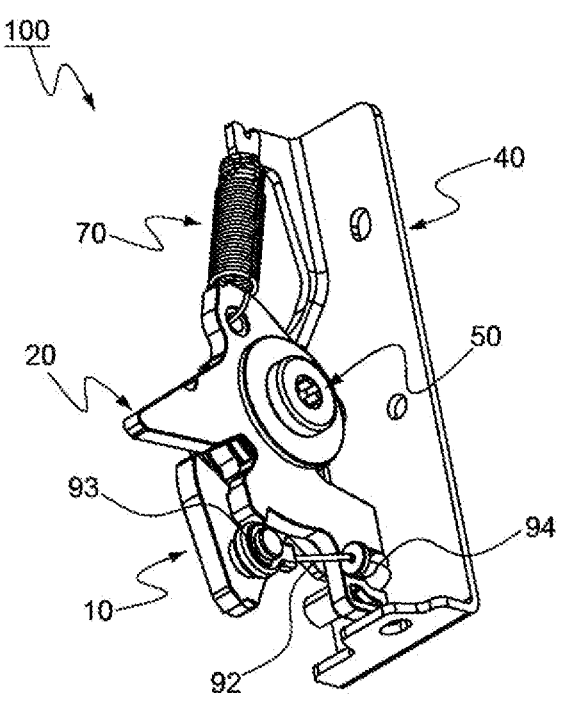
FIGS. 4A and 4B are perspective views showing the assembled configuration of the seatback restraint device according to the present disclosure.
Figure 5:
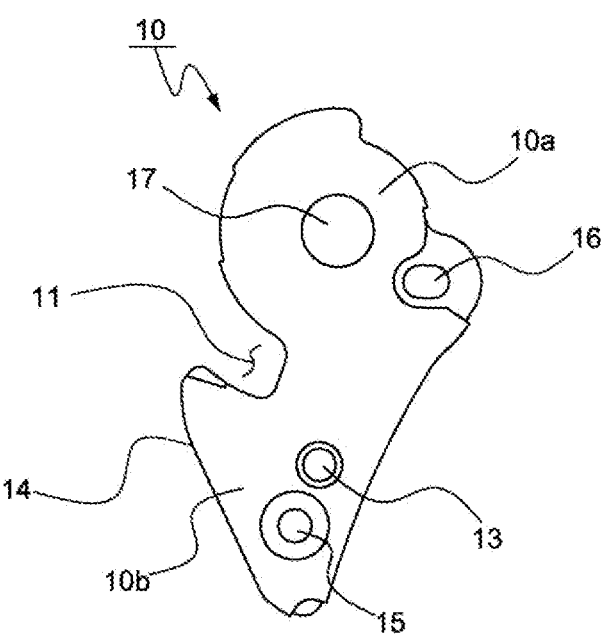
FIG. 5 is an exemplary view showing the configuration of a first latch according to the present disclosure.
Figure 6:
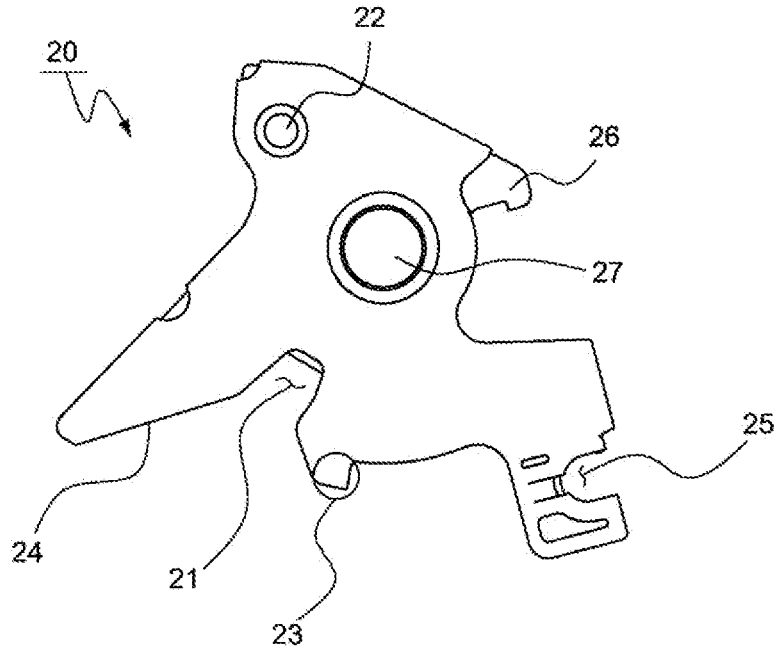
FIG. 6 is an exemplary view showing the configuration of a second latch according to the present disclosure.
Figure 7A:
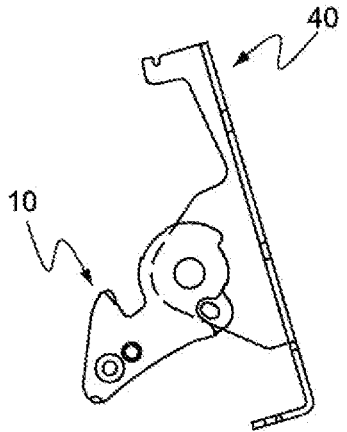
FIGS. 7A to 7E are exemplary views showing connection relations among elements in the seatback restraint device according to the present disclosure.
Figure 7B:
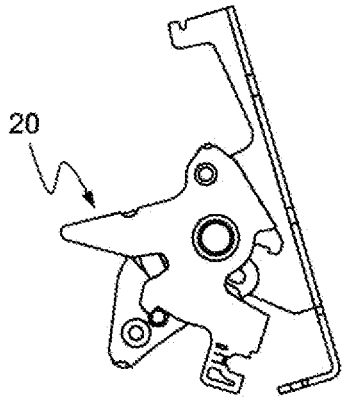
Figure 7C:
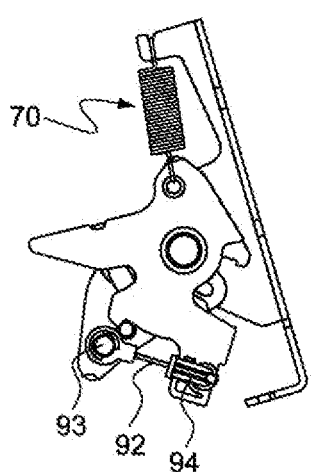
Figure 7D:
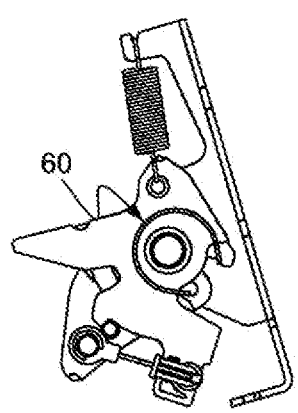
Figure 7E:
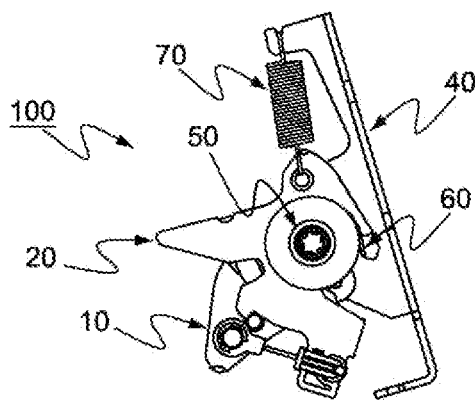
Figure 8A:
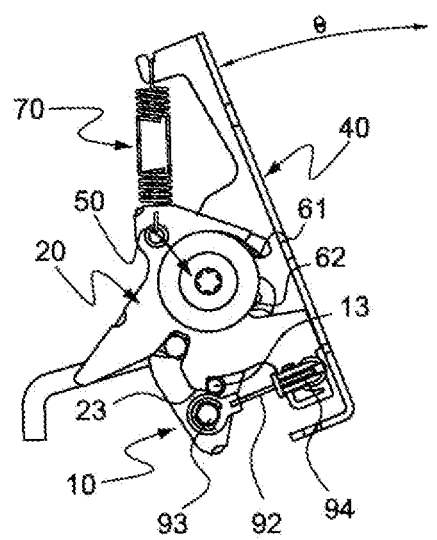
FIGS. 8A to 8C are exemplary views showing the respective restraint states of a striker by the seatback restraint device.
Figure 8B:
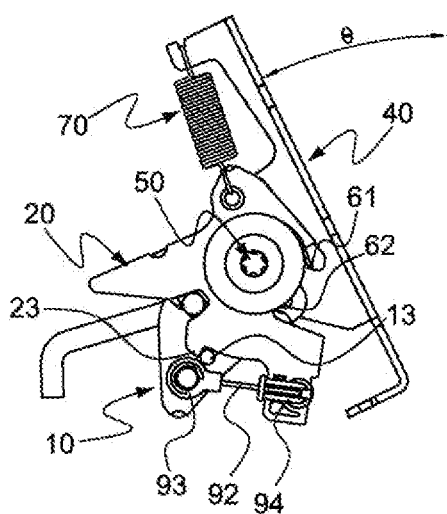
Figure 8C:
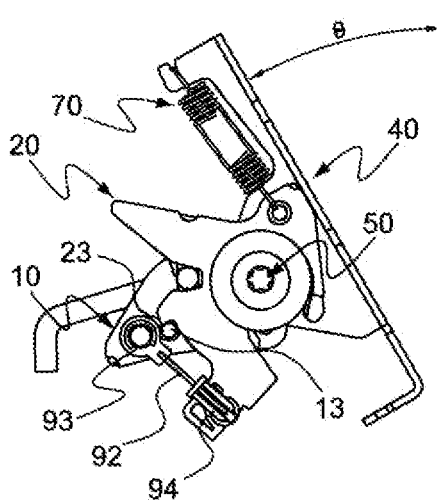
Figure 9A:
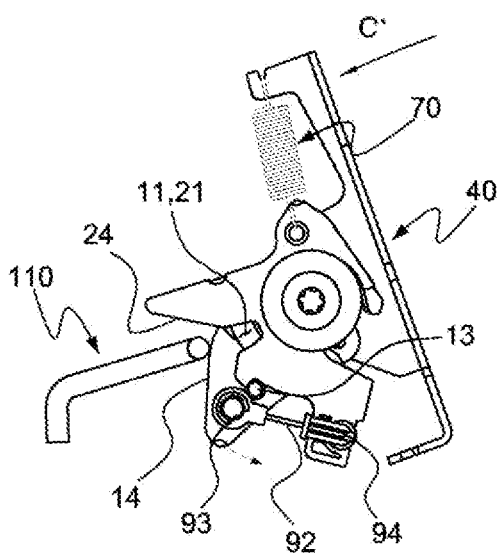
FIGS. 9A to 9C are exemplary views showing a process of restraining the striker by the seatback restraint device.
Figure 9B:
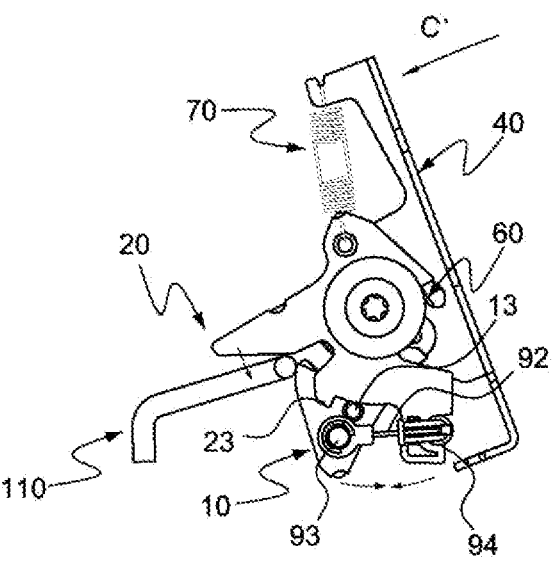
Figure 9C:
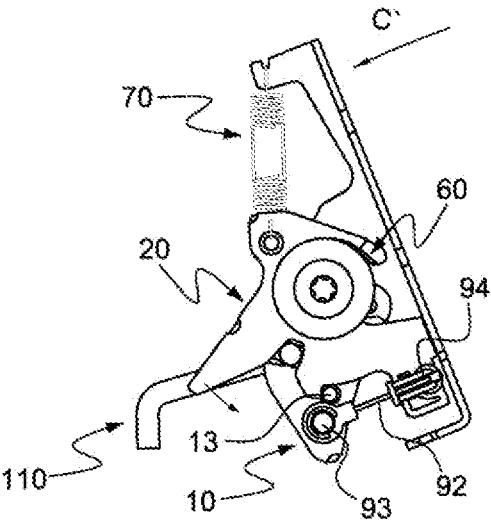
Figure 10A:
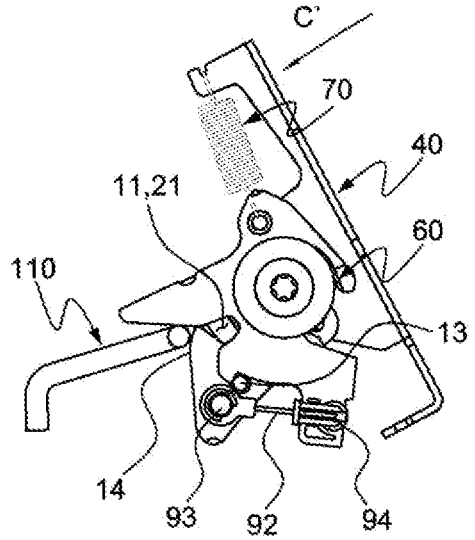
FIGS. 10A to 10C are other exemplary views showing the process of restraining the striker by the seatback restraint device.
Figure 10B:
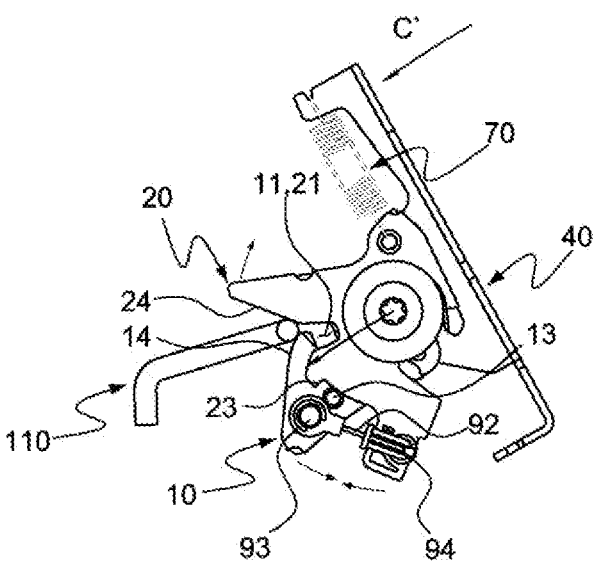
Figure 10C:
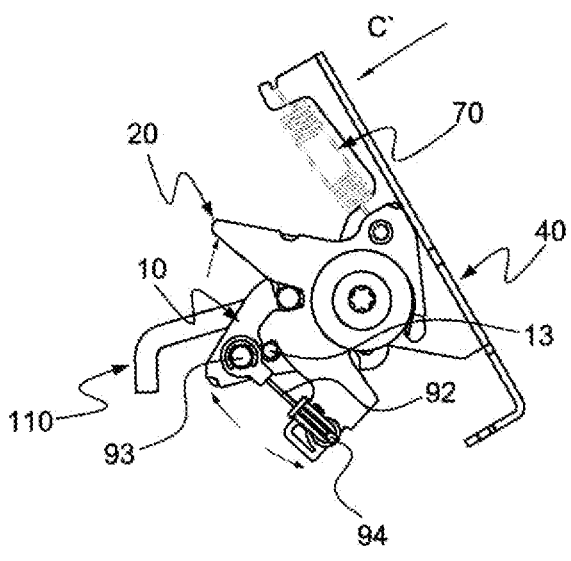
Figure 11A:
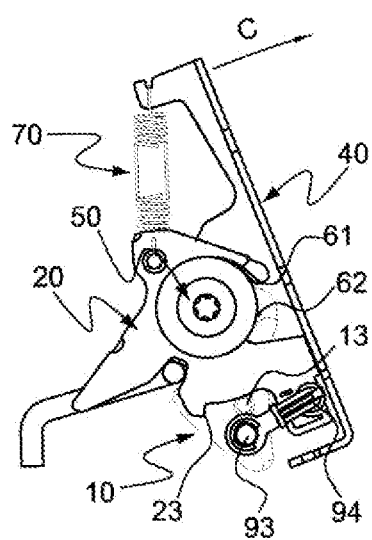
FIGS. 11A to 11C are exemplary views showing a process of releasing the striker from the seatback restraint device.
Figure 11B:
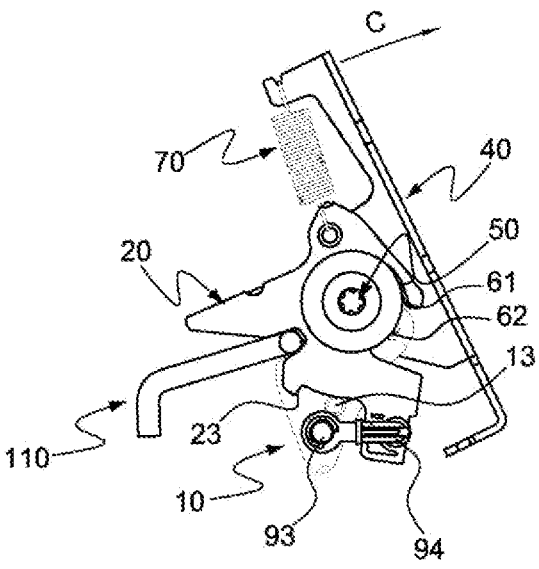
Figure 11C:
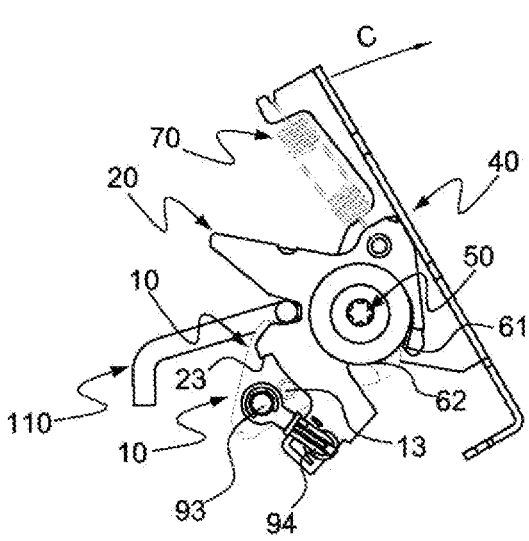

FIG. 1 is an exemplary exploded view showing the configuration of a seatback restraint device for a vehicle according to the present disclosure, FIG. 2 is another exemplary exploded view showing the configuration of the seatback restraint device according to the present disclosure, FIG. 3 is a view showing the assembled configuration of the seatback restraint device according to the present disclosure, FIGS. 4A and 4A are views showing the assembled configuration of the seatback restraint device according to the present disclosure, FIG. 5 is an exemplary view showing the configuration of a first latch according to the present disclosure, FIG. 6 is an exemplary view showing the configuration of a second latch according to the present disclosure, FIGS. 7A to 7E are exemplary views showing connection relations among elements in the seatback restraint device according to the present disclosure, FIGS. 8A to 8C are exemplary views showing the respective restraint states of a striker by the seatback restraint device, FIGS. 9A to 9C are exemplary views showing a process of restraining the striker by the seatback restraint device, FIGS. 10A to 10C are other exemplary views showing the process of restraining the striker by the seatback restraint device, and FIGS. 11A to 11C are exemplary views showing a process of releasing the striker from the seatback restraint device.

The present disclosure is configured such that a first latch provided with a first latch recess and a second latch provided with a second latch recess are connected to be rotated and operated in a scissoring motion, one side of the first latch and one side of the second latch are connected to each other by a first elastic body, and other sides of the first and second latches are connected to each other by an operating cable, so that a striker inserted into the first and second latch recesses is restrained by scissoring operation of the first and second latches due to the elastic force of the first elastic body, and restraint of the striker by the first and second latch recesses is released by mutual operation in which the first elastic body is compressed and the first latch is moved toward the second latch or the second latch is moved toward the first latch (i.e., scissoring operation of the first and second latches) by pulling the operating cable.

That is, a seatback restraint device for a vehicle 100 according to the present disclosure includes a first latch 10 provided with a first latch recess 11 configured such that a striker 110 of a vehicle body is inserted thereinto, a second latch 20 provided with a second latch recess 21 configured such that the striker 110 of the vehicle body is inserted thereinto, a main hinge 50 configured to penetrate the first and second latches 10 and 20 and to be connected to a fixing bracket 40 so as to enable rotation and a scissoring operation of the first latch 10 and the second latch 20, a first elastic body 60 having both ends connected to and supported by one end of the first latch and one end of the second latch 20, and an operating cable 90 connected to the first latch 10 and the second latch 20, and the first and second latches 10 and 20 are mutually operated by the operating cable 90.

In the seatback restraint device for a vehicle 100 having the above configuration, the striker 110 inserted into the first and second latch recesses 11 and 21 is restrained (locked) by operating the first and second latches 10 and 20 in a scissoring motion so that the first latch recess 11 of the first latch 10 and the second latch recess 21 of the second latch 20 overlap each other due to the elastic force of the first elastic body 60, the restraint (locking) of the striker 110 is released by spacing the first latch recess 11 of the first latch 10 from the striker 110 located in the second latch recess 12 of the second latch 20 by mutually operating the first and second latches 10 and 20 (in the scissoring motion) about the main hinge 50 so that the first latch recess 11 of the first latch 10 and the second latch recess 21 of the second latch 20 are spaced apart from each other by the pulling operation of the operating cable 90 and thus the first latch recess 11 of the first latch 10 is spaced apart from the striker 110 located in the second latch recess 21 of the second latch 20, and in the state in which the striker 110 is restrained (locked), the first and second lathes 10 and 20 are rotated to adjust the inclination angle and height of a seatback frame 210 depending on the position of a cushion frame 220.

That is, in the seatback restraint device for a vehicle according to the present disclosure, in the case that the inclination angle of the seatback frame 210 changes as the position of a seat cushion changes, when the striker 110 comes into contact with a first inclined end 14 of the first latch 10 or a second inclined end 24 of the second latch 20, the first and second latches 10 and 20, the first elastic body 60 and the operating cable 90 are simultaneously rotated to enable insertion of the striker 110, and when the operating cable 90 is operated, the first latch 10 and the second latch 20 are relatively mutually operated at any position to enable release of the striker 110.

Further, the seatback restraint device for a vehicle 100 according to the present disclosure includes a second elastic body 70 having the lower end connected to the second latch 20 and the upper end connected to the fixing bracket 40 or the seatback frame 210 so as to be located above the main hinge 50. In the seatback restraint device for a vehicle 100 according to the present disclosure configured as described above, when restraint (locking) of the striker 110 is released, the first and second latches 10 and 20 are rotated and moved to certain positions by elastic force of the second elastic body 70 and the first elastic body 60.

The first latch 10 includes, as shown in FIGS. 1 to 4B, a latch body 10a configured such that one end 61 of the first elastic body 60 is elastically supported thereby and the main hinge 50 is connected thereto, and a hook 10b formed integrally with the latch body 10a to form the first latch recess 11 between the latch body 10a and the hook 10b, and configured such that one end of the operating cable 90 is connected to the hook 10b.

That is, as shown in FIG. 5, the first latch 10 has the first latch recess 11 with one open side to allow the striker 110 to be inserted thereinto between the latch body 10a and the hook 10b, and the latch body 10a and the hook 10b are integrally connected.

The first latch recess 11 restrains (locks) the striker 110 by overlapping the second latch recess 21 of the second latch 20, and one side of the first latch recess 11 is open so that the striker 110 is inserted thereinto in the upward direction when the first latch 10 is rotated about the main hinge 50.

Further, in the first latch 10, one surface of the hook 10b facing the first latch recess 11 is formed as the first inclined end 14. The first inclined end 14 has a function of rotating the first latch 10 by contact with the striker 110 so that the striker 110 may be inserted into the first latch recess 11. The first inclined end 14 has an inclination symmetrical to the inclination of the second inclined end 24 of the second latch 20, which will be described below, and is connected to the first latch recess 11 so that the striker 110 is guided to the first latch recess 11.

In addition, the latch body 10a is provided with a locking part 16 by which one end 61 of the first elastic body 60 is elastically supported, and the hook 10b is provided with a stopper protrusion 13 which comes into contact with one side of the second latch 20 to restrict rotation of the first and second latches 10 and 20.

The locking part 16 may be formed as a recess provided in the latch body 10a, or may be formed as a protrusion provided on the latch body 10a.

The stopper protrusion 13 comes into contact with one side of the second latch 20, i.e., a locking protrusion 23 of the second latch 20, when the first latch 10 and the second latch 20 are operated in the scissoring motion so that the first latch recess 11 of the first latch 10 and the second latch recess 21 of the second latch 20 overlap each other by the elastic force of the first elastic body 60 in the state in which restraint of the striker 110 by the first and second latches 10 and 20 is released, and thus has a function of restricting rotation of the first and second latches 10 and 20.

The stopper protrusion 13 protrudes from one side of the hook 10b of the first latch 10 so that the stopper protrusion 13 comes into contact with and is supported by the locking protrusion 23 provided on the second latch 20 without interfering with rotation of the second latch 20.

Further, a connection hole 15 is formed in the hook 10b of the first latch 10 so as to facilitate connection of the operating cable 90, and a main hole 17 into which the main hinge 50 is connected is formed in the latch body 10a. Here, the connection hole 15 may be formed in the hook 10b to be located at the longest distance from the main hole 17 so as to facilitate rotation of the first latch 10 about the main hinge 50.

The second latch 20 is connected to the fixing bracket 40 so as to be rotatable about the main hinge 50, and includes the second latch recess 21 into which the striker 110 is inserted, and a cable connection recess 25 to which one side of the operating cable 90 is connected, as shown in FIG. 6.

The second latch recess 21 restrains (locks) the striker 110 by overlapping the first latch recess 11 of the first latch 10, and one side of the second latch recess 21 is open to allow insertion of the striker 110. Here, the second latch recess 21 is open in a direction different from the opening direction of the first latch recess 11.

As an example, as shown in the figures, the second latch recess 21 may be formed such that one side thereof is open toward the striker 110 when the seatback frame 210 is rotated in the direction of the striker 110, and may be concave with a predetermined depth toward the main hinge 50, and the first latch recess 11 of the first latch 10 may be formed such that one side thereof is open in a direction perpendicular to the opening direction of the second latch recess 21.

In addition, as shown in FIG. 6, one surface of the second latch 20 facing the second latch recess 21 is formed as the second inclined end 24.

The second inclined end 24 has a function of rotating the second latch 20 by contact with the striker 110 so that the striker 110 may be inserted into the second latch recess 21, has an inclination symmetrical to the inclination of the first inclined end 14 of the first latch 10, and is connected to the second latch recess 21.

That is, the second inclined end 24 has an inclination symmetrical to the inclination of the first inclined end 14 of the first latch 10 and is connected to the second latch recess 21 so as to guide the striker 110 to the second latch recess 21.

As above, the first inclined end 14 of the first latch 10 and the second inclined end 24 of the second latch 20 may be formed with a designated inclination to form a V-shaped structure in which the distance between the first inclined end 14 and the second inclined end 24 becomes decreased in the direction of the main hinge 50, as shown in FIG. 3, when restraint of the striker 110 by the first and second latches 10 and 20 is released and thus the first and second latches 10 and 20 are rotated about the main hinge 50 due to the elastic force of the first and second elastic bodies 60 and 70.

The cable connection recess 25 is configured such that one side of the operating cable 90 is rotatably connected to the cable connection recess 25 to be supported thereby, and is formed at one side end of the second latch 20 to prevent interference with a scissoring operation of the first and second latches 10 and 20 about the main hinge 50 and insertion of the striker 110 into the second latch recess 21, as shown in FIG. 6.

In addition, the second latch 10 includes, as shown in FIG. 6, a locking part 26 configured to elastically support the other end 62 of the first elastic body 60, and the locking protrusion 23 configured to come into contact with one side of the first latch 10 so as to restrict rotation of the first and second latches 10 and 20.

The locking part 26 may be formed as a recess which penetrates the second latch 20, or may be formed as a locking protrusion which is provided on one side of the second latch 20.

The locking protrusion 23 is provided on one side of the second latch 20 so as to contact and support the stopper protrusion 13 provided on the first latch 10, and has a function of restricting rotation (scissoring) of the first and second latches 10 and 20 by the elastic force of the first elastic body 60.

Further, the second latch 20 includes, as shown in FIG. 6, a support hole 22 where a lower end 72 of the second elastic body 70 is locked and supported, and a main hole 27 to which the main hinge 50 is connected. Here, based on the main hole 27, the support hole 22 is located at the upper portion of the second latch 20, and the cable connection recess 25 is located at the lower portion of the second latch 20.

In the second latch 20 having the above-described configuration, the support hole 22, the locking part 26, the cable connection recess 25, the locking protrusion 23, and the second latch recess 21 are provided around the main hole 27 so as not to interfere with one another's operations and not to overlap one another. As an example, the support hole 22, the locking part 26, the cable connection recess 25, the locking protrusion 23, and the second latch recess 21 may be radially disposed around the main hole 27 so as not to overlap one another.

As shown in FIGS. 1 to 4B, the main hinge 50 penetrates the first and second latches 10 and 20 and is connected to the fixing bracket 40 so that the first latch 10 and the second latch 20 are rotated about the same center. That is, the main hinge 50 is connected to the fixing bracket 40 through the main hole 17 of the first latch 10 and the main hole 27 of the second latch 20.

As an example, the main hinge 50 may include a bolt hinge 51 configured to penetrate the main hole 17 of the first latch 10 and the main hole 27 of the second latch 20, and a nut hinge 52 fastened to the bolt hinge 51.

In addition, the main hinge 50 may further include a washer 53 configured to facilitate rotation of the first and second latches 10 and 20 and to prevent separation of the first elastic body 60.

The first elastic body 60 is installed such that both ends 61 and 62 thereof are connected to and supported by the first and second latches 10 and 20, and provides elastic force to operate the first and second latches 10 and 20 in the scissoring motion about the main hinge 50.

That is, the first elastic body 60 is installed around the main hinge 50 so that one end 61 of the first elastic body 60 is supported by the first latch 10 and the other end 62 of the first elastic body 60 is supported by the second latch 10, as shown in FIG. 3.

The first elastic body 60 installed in this way provides elastic force to enable scissoring operation of the first and second latches 10 and 20 about the main hinge 50 so that the first latch recess 11 of the first latch 10 and the second latch recess 21 of the second latch 20 overlap each other to restrain the striker 110 inserted into the first and second latch recesses 11 and 21.

Further, although the type of the first elastic body 60 is not specified, a torsion spring may be used as an example.

One end of the second elastic body 70 is connected to and supported by the second latch 20, and the other end of the second elastic body 70 is connected to and supported by the seatback frame 210 or the fixing bracket 40, and the second elastic body 70 applies elastic force to the second latch 20 so that the second latch recess 21 is rotated about the main hinge 50.

Figure 4B:
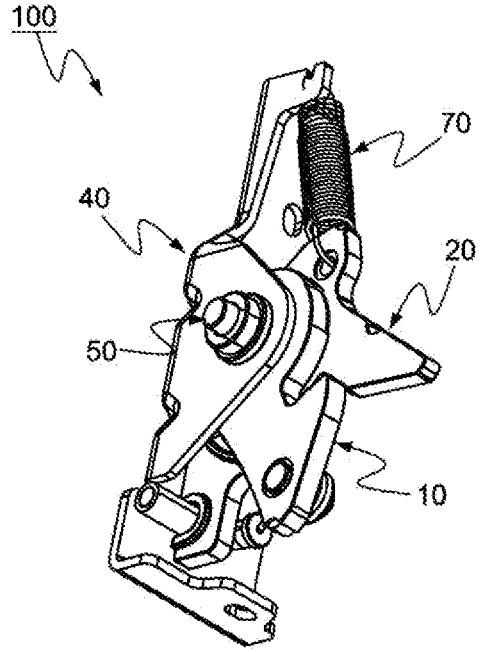

FIGS. 3, 4A and 4B of the present disclosure show a configuration in which the lower end 72 of the second elastic body 70 is connected to and supported by the second latch 20 and the upper end 71 of the second elastic body 70 is connected to and supported by the seatback frame 210 or the fixing bracket 40, and the following description will thus be focused on this configuration.

The second elastic body 70 connected in this way provides elastic force to rotate the second latch 20 to a designated position, as shown in FIG. 3, when the striker 110 is spaced apart from the first and second latch recesses 11 and 21 (i.e., in the state in which restraint of the seatback is released), and thereby, the striker 110 may be smoothly inserted into the first and second latch recesses 11 and 21, when the seatback is rotated in the direction of the striker 110 so as to be restrained.

That is, when the striker 110 is spaced apart from the first and second latch recesses 11 and 21, the second latch 20 is rotated to the designated position about the main hinge 50 due to elastic force of the second elastic body 70, the first latch 10 is also rotated to a designated position due to elastic force of the first elastic body 60 when the second elastic latch 20 is rotated because the first latch 10 is connected to the second latch 20 by the first elastic body 60, and thus, the first and second latches 10 and 20 maintain the designated positions (referred to hereinafter "initial positions"), as shown in FIGS. 3, 9A and 10A.

Further, when the first and second latches 10 and 20 are rotated to the initial positions, the stopper protrusion 13 of the first latch 10 and the locking protrusion 23 of the second latch 20 come into contact with and are supported by each other by the elastic force of the first elastic body 60, and the first and second latch recesses 11 and 21 of the first and second latches 10 and 20 are maintained in the overlapping state like in the restrained state of the striker 110.

After the first and second latches 10 and 20 are rotated to the initial positions in this way, when the seatback frame 210 is rotated rearward and locked with the striker 110, the striker 110 comes into contact with the first inclined end 14 of the first latch 10 and the second inclined end 24 of the second latch 20 and thus regardless of the position of a seat and thus the first latch 10 or the second latch 20 is rotated, and thereby, the overlapping state of the first and second latch recesses 11 and 21 is released, as shown in FIGS. 9A to 9C and FIGS. 10A to 10C. That is, the second latch recess 21 is open by rotation of the first latch 10 or the second latch 20, thereby enabling smooth insertion of the striker 110.

Further, the second elastic body 70 according to the present disclosure has a function of providing elastic force to the second latch 20 so that one side of the second latch recess 21 comes into contact with and is supported by the striker 110, when the striker 110 is inserted into the second latch recess 21, as shown in FIGS. 8A to 8C, and thus, the position of the second latch 20 is supported and thereby the striker 110 is restrained without a separate restraining unit.

That is, the second elastic body 70 rotates the second latch 20 about the main hinge 50 so that one side of the inner surface of the second latch recess 21 comes into contact with and is supported by the striker 110 due to elastic force, thereby supporting the position of the second latch 20. When the position of the second latch 20 is supported, as described above, the elastic force of the first elastic body 60 is applied to the first latch 10 to rotate the first latch 10 with respect to the second latch 20, and thereby, the first and second latch recesses 11 and 21 overlap each other due to rotational movement of the first latch 10, and the striker 110 is restrained within the first and second latch recesses 11 and 21.

In addition, the second elastic body 70 according to the present disclosure has a function of allowing the first latch 10 to be rotated by the operation of the operating cable 90 so as to facilitate release of the striker 110 from the first and second latch recesses 11 and 21, as shown in FIGS. 11A to 11C.

That is, the second elastic body 70 provides elastic force so that the second latch 20 comes into contact with and is supported by the striker 110, and thus rotates the first latch 10 with respect to the second latch 20 when the operating cable 90 is pulled (restraint of the striker 110 is released) in the state in which the striker 110 is inserted into the second latch recess 21, and thereby, the first latch recess 11 is spaced apart from the second latch recess 21 by rotation of the first latch 10, and the restraint of the striker 110 in the first and second latch recesses 11 and 21 is released.

Although the type of the second elastic body 70 having the above function is not specified, the second elastic body 70 may be a coil spring. That is, when the second elastic body 70 is a coil spring, the lower end 72 of the second elastic body 70 is connected to and supported by the second latch 20 and the upper end 72 of the second elastic body 70 is connected to and supported by the seatback frame 210 as shown in FIG. 3, when restraint (locking) of the striker 110 is released, the second latch 20 is rotated and the position thereof is supported so that the center of the main hinge 50 is located on a straight line formed by the upper end 71 and the lower end 72 of the second elastic body 70 by the elastic force of the second elastic body 70 or the center of the main hinge 50 is located on the central line of the second elastic body 70, i.e., the coil spring, and thereby, the first latch 10 is rotated about the main hinge 50 by the elastic force of the first elastic body 60 with respect to the second latch 20, and thus the first and second latches 10 and 20 are moved to the respective initial positions thereof.

The operating cable 90 has a function of mutually rotating the first latch 10 and the second latch 20 to space the first latch recess 11 of the first latch 10 and the second latch recess 21 of the second latch 20 apart from each other so as to release restraint of the striker 110.

One end of the operating cable 90 may be rotatably fixed to the second latch 20 via the first latch 10, or may be rotatably fixed to the first latch 10 via the second latch 20.

That is, the operating cable 90 may include a connector 93 rotatably connected to the first latch 10 or the second latch 20, a hollow guide tube 94 rotatably connected to the second latch 20 or the first latch 10, and a cable rod 92 having one end fixed to the connector 93 via the guide tube 94 and the other end connected to a restraint release lever 91.

The operating cable 90 having the above configuration performs mutual operation of the first and second latches 10 and 20 in which the first latch 10 is rotated toward the second latch 20, the second latch 20 is rotated toward the first latch 10, or the first and second latches 10 and 20 are simultaneously rotated, when the restraint release lever 91 is pulled.

The drawings of the present disclosure show a configuration in which the connector 93 is connected to the first latch 10, the guide tube 94 is connected to the second latch 20, and the cable rod 92 is connected thereto, and the following description will thus be focused on this configuration.

As shown in FIGS. 3 and 7A to 7E, the operating cable 90 may include the connector 93 rotatably connected to the first latch 10, the hollow guide tube 94 rotatably connected to the second latch 20, and the cable rod 92 having one end fixed to the connector 93 via the guide tube 94 and the other end connected to the restraint release lever 91.

In the operating cable 90 having the above configuration, when the restraint release lever 91 is pulled, the connector 93 is moved in the direction of the guide tube 94 by the cable rod 92, the first latch 10 provided with the connector 93 installed thereon is rotated about the main hinge 50, the first latch recess 11 is separated from the second latch recess 21 by rotation of the first latch 10, and thus, restraint of the striker 110 by the first and second latch recesses 11 and 21 is released.

That is, because when the striker 110 is inserted into the first and second latch recesses 11 and 21 and restrained, one side of the inner surface of the second latch recess 21 of the second latch 20 is maintained in the state of contacting and being supported by the striker 110 by the elastic force of the second elastic body 70, when the cable rod 92 is pulled by the restraint release lever 91, the second latch 20 to which the guide tube 94 is connected is not moved, and the other end of the first latch 10 to which the connector 93 is connected is rotated in the direction of the other end of the direction of the second latch 20 provided with the guide tube 94, so that the second latch recess 21 and the first latch recess 11 are separated from each other. Here, the first elastic body 60 having both ends connected to and supported by the first and second latches 10 and 20 is compressed, and the guide tube 94 rotatably connected to the second latch 20 is rotated to achieve linear movement of the cable rod 92.

When the first and second latch recesses 11 and 21 are separated from each other, one side of the second latch groove 21 is open. Therefore, when the seatback frame 210 is rotated in a direction away from the striker 110, the striker 110 is separated from the second latch recess 21 so that restraint of the seatback frame 210 is released, the second latch 20 is rotated due to the elastic force of the second elastic body 70, and when the pulling force applied to the operating cable 90 is released, the second latch 20 is also rotated due to the elastic force of the first elastic body 60.

Further, when the second latch 20 is rotated due to the elastic force of the second elastic body 70, the first latch 10 connected to the second latch 20 by the first elastic body 60 is also rotated about the main hinge 50 together with the second latch 20, and when the pulling force applied to the operating cable 90 is released, the second latch 20 is rotated due to the elastic force of the first elastic body 60 so that the first latch recess 11 and the second latch recess 22 overlap each other, and the first and second latches 10 and 20 are returned to the initial positions thereof.

The seatback restraint device 100 of the present disclosure configured as described above may stably restrain the striker 110 fixed to the vehicle body by varying the inclination angle θ of the seatback frame 210 even when the position of the seat is changed by a seat sliding device 300.

In addition, the seatback restraint device 100 according to the present disclosure allows the cushion frame 220 to be moved in the forward and rearward directions of the vehicle body by the seat sliding device 300 even in the state in which the seatback frame 210 is restrained by the striker 110. That is, the present disclosure may be applied to a slouch seat 200 in which the inclination angle θ of a seatback frame 210 is adjusted as a seat cushion frame 220 is moved in the forward and rearward directions of a vehicle.

Figure 12:
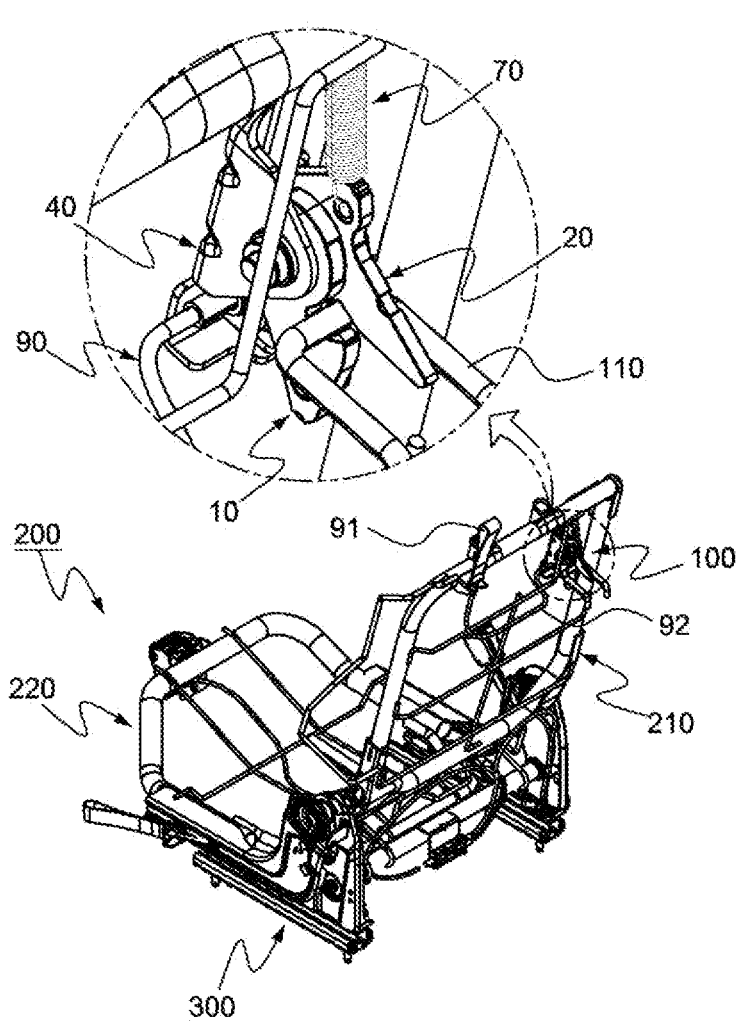
FIG. 12 is an exemplary view showing the configuration of a slouch seat to which the seatback restraint device according to the present disclosure is applied.
Figure 13A:
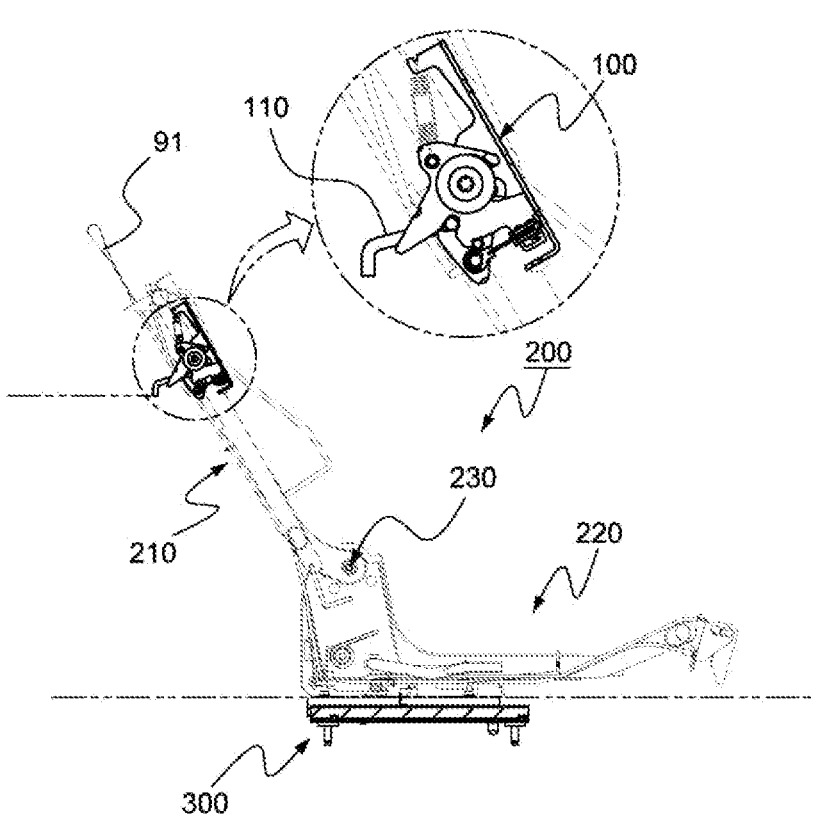
FIGS. 13A and 13B are exemplary views showing the operating states of the slouch seat to which the seatback restraint device according to the present disclosure is applied.
Figure 13B:
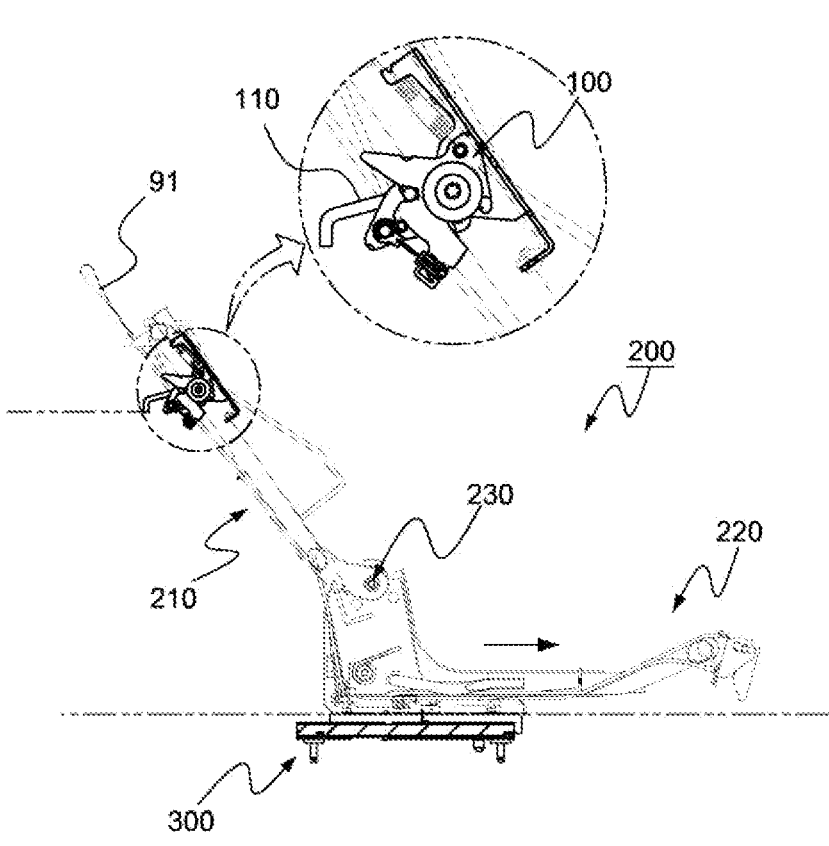

FIG. 12 is an exemplary view showing the configuration of a slouch seat to which the seatback restraint device for a vehicle according to the present disclosure is applied, and FIGS. 13A and 13B are exemplary views showing the operating states of the slouch seat to which the seatback restraint device for a vehicle according to the present disclosure is applied.

The slouch seat 200 provided with the seatback restraint device 100 according to the present disclosure is configured such that the cushion frame 220 is connected to the seat sliding device 300, the seatback frame 210 and the cushion frame 220 is connected by a hinge 230, and thereby, the cushion frame 220 may be moved in the forward and rearward directions of the vehicle as the inclination angle of the seatback frame 210 is adjusted along the seat sliding device 300.

That is, the slouch seat 200 according to the present disclosure may include, as shown in FIGS. 12, 13A and 13B, the cushion frame 220 connected to the seat sliding device 300, the seatback frame 210 rotatably hinged to the cushion frame 220, and the seatback restraint device 100 engaged with a striker 110, which is fixed to the seatback frame 210 and installed on the vehicle body, so as to restrain the position of the seatback frame 210.

The seatback restraint device 100 has already been described in detail above, and a description thereof will thus be omitted.

In the slouch seat 200 having the above configuration, when the striker 110 is inserted into the first and second latch recesses 11 and 21 and is thus restrained (locked) therein, the first and second latches 10 and 20 of the seatback restraint device 100 are rotated about the main hinge 50 and are revolved around the striker 110, and therefore, the cushion frame 220 may be moved in the forward and rearward directions of the vehicle by the seat sliding device 300 even in the state in which the striker 110 is inserted into the first and second latch recesses 11 and 21 and is thus restrained therein.

That is, when the cushion frame 220 is moved in the forward and rearward directions of the vehicle by the seat sliding device 300 in the state in which the seatback frame 210 is restrained by the striker 110, the seatback frame 210 is moved in the upward and downward directions depending on the movement range of the cushion frame 220, and simultaneously, the inclination angle of the seatback frame 210 is adjusted.

Further, the slouch seat 200 according to the present disclosure includes not only a seat structure in which the cushion frame 220 and the seatback fame 210 are connected by the hinge 230 but also a seat structure in which the cushion frame 220 and the seatback fame 210 are connected by the hinge 230 and a recliner (not shown).

In addition, the seatback restraint device 100 according to the present disclosure may be applied not only to the slouch seat 200 but also to a folding seat (not shown) in which a seatback frame is simply folded without sliding a cushion frame.

Restraint of Striker

FIGS. 8A to 8C are exemplary views showing the respective restraint states of the striker by the seatback restraint device according to the present disclosure, and specifically, FIG. 8A shows the restraint state of the striker when the seatback frame is maximally upright, FIG. 8C shows the restraint state of the striker when the seatback frame is maximally reclined (lying down), and FIG. 8B shows the restraint state of the striker when the seatback frame is in an intermediate state between the upright state and the reclined state of the seatback frame, respectively.

That is, because the striker 110 is fixed to the vehicle body at a designated height, but the seatback restraint device 100 according to the present disclosure is configured such that the first and second latches 10 and 20 are rotated about the main hinge 50, there is a difference in the rotation amounts of the first and second latches 10 and 20 depending on the inclination angle (slope) of the seatback frame 210, and thereby, restraint (locking) of the striker 110 is achieved regardless of the inclination angle of the seatback frame 210, as shown in FIGS. 8A to 8C.

Restraining Action of Striker

FIGS. 9A to 10C are views showing a process of restraining the striker depending on rotation of the seatback frame.

When the seatback frame 210 (in the state in which the first and second latches 10 and 20 are at the initial positions) is rotated in the direction C' of the striker 110, the striker comes into contact with the first inclined end 14 of the first latch 10 or the second inclined end 24 of the second latch 20, or the first and second inclined ends 14 and 24 of the first and second latches 10 and 20 depending on the position of the cushion frame 220, and when the seatback frame 210 continues to be rotated in the direction C' of the striker 110 in the contact state of the striker 110 with the first inclined end 14 and/or the second inclined end 24, the first and second latches 10 and 20 are rotated about the main hinge 50 while compressing the first elastic body 60, overlap between the first and second latch recesses 11 and 21 of the first and second latches 10 and 20 is released, and the second latch recess 21 of the second latch 20 is open so that the striker 110 is inserted into the second latch recess 21.

As such, when the striker 110 is inserted into the second latch recess 21 of the second latch 20, the second latch 20 is rotated about the main hinge 50 by elastic force of the first elastic body 60 so that one side of the second latch recess 21 comes into contact with the striker 110 and is supported thereby, the first latch 10 is also rotated by rotational movement of the seatback frame 210 and elastic force of the second elastic body 70 so that the second latch recess 21 of the second latch 20 is coupled to the striker 110 and the first and second latch recesses 11 and 21 of the first and second latches 10 and 20 overlap each other to restrain (lock) the striker 110.

Releasing Action of Striker

FIGS. 11A to 11C are exemplary views showing a process of releasing restraint of the striker depending on operation of the operating cable, and specifically, FIG. 11A shows the state in which restraint of the striker is released when the seatback frame is maximally upright, FIG. 11C shows the state in which restraint of the striker is released when the seatback frame is maximally reclined (lying down), and FIG. 11B shows the state in which restraint of the striker is released when the seatback frame is in the intermediate state between the upright state and the reclined state of the seatback frame, respectively.

In the present disclosure, when pulling force is applied to the cable rod 92 by the restraint release lever 91, the first latch 10 is rotated about the main hinge 50 while compressing the first elastic body 60, so that the connector 93 is moved in the direction of the guide tube 94, the first latch recess 11 of the first latch 10 is separated from the second latch recess 21 of the second latch 20, and thereby, restraint of the striker 110 is released.

When the seatback frame 210 is rotated in a direction C in the state in which restraint of the striker is released, the second latch recess 21 of the second latch 20 is spaced apart from the striker 110, and thereby, restraint of the seatback is released.

Operation of Slouch Seat

FIGS. 13A and 13B show a process of moving the cushion frame by the seat sliding device in the state in which the seatback frame is restrained by the striker.

In the seatback restraint device 100 according to the present disclosure, the first and second latches are rotated about the main hinge and revolved around the striker 110, and thus when the cushion frame 220 is moved in the forward and rearward directions of the vehicle, the inclination angle of the seatback frame 210 and the height of the seatback frame 210 are changed depending on the position of the cushion frame 220. That is, the inclination angle and height of of the seatback frame 210 are automatically changed while maintaining the restrained state of the seatback frame 210 by the striker 110, thereby achieving sliding of the seat. As is apparent from the above description, in a seatback restraint device for a vehicle according to the present disclosure, the positions of first and second latches are supported by first and second elastic bodies without separate support units, and the first and second latches are rotated and operated in a scissoring motion about a main hinge by the elastic force of the first and second elastic bodies, so that first and second latch recesses of the first and second latches overlap each other or are separated from each other, thereby being capable of freely allowing a seatback to be restrained by the striker or released from the striker.

The seatback restraint device according to the present disclosure has a simple structure in which the first and second latches are operated in the scissoring motion about the main hinge by the elastic force of the first and second elastic bodies, thereby being capable of improving operability and ease in maintenance and achieving miniaturization.

Because the first and second latches are rotated about the main hinge, in the case in which the seatback restraint device according to the present disclosure is applied to a seat provided with a seat sliding device, when a cushion frame is moved by the seat sliding device, the inclination angle and height of a seatback frame are automatically changed while maintaining the state in which the seatback frame is restrained (locked) by the striker, thereby being capable of securing convenience of a passenger.

The seatback restraint device according to the present disclosure allows the seatback frame to be restrained (locked) by the striker fixed to a vehicle body regardless of the position of the cushion frame, and may thus be applied to a folding seat as well as a slouch seat so that the seatback frame may be freely folded and restrained.

The seatback restraint device according to the present disclosure may be applied to the rear seat of a truck, a passenger car, or a van, thereby being capable of expanding a cargo loading space and improving space utilization.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

In addition, the terms described in the present disclosure are intended to distinguish one element from other elements and aid understanding the present disclosure, and therefore, the elements of the present disclosure are not limited by the described terms.

What is claimed is:

1. A seatback restraint device for a vehicle, comprising:
   a first latch provided with a first latch recess, wherein a striker of a vehicle body is configured to be inserted into the first latch recess;
   a second latch provided with a second latch recess, wherein the striker is configured to be inserted into the second latch recess;
   a main hinge configured to penetrate the first and second latches so as to enable rotation and a scissoring operation of the first latch and the second latch; and
   an operating cable directly connected to and supported by the first latch and the second latch,
   wherein the first and second latches are operated relative to each other by the operating cable.

2. The seatback restraint device of claim 1, wherein the second latch recess of the second latch is formed so that one side of the second latch recess is open toward the striker when a seatback frame is rotated in a direction of the striker.

3. The seatback restraint device of claim 2, wherein first latch recess of the first latch is formed so that one side of the first latch recess is open in a direction perpendicular to an opening direction of the second latch.

4. The seatback restraint device of claim 1, further comprising a fixing bracket operably connected to the main hinge to enable the scissoring operation of the first and second latches.

5. The seatback restraint device of claim 1, further comprising a first elastic body having first and second ends.

6. The seatback restraint device of claim 5, wherein the first and second ends of the first elastic body are connected to and supported by at least one end of the first latch or one end of the second latch.

7. The seatback restraint device of claim 5, further comprising a second elastic body having one end connected to the second latch and another end connected to a fixing bracket or the seatback frame.

8. The seatback restraint device of claim 7, wherein:

one surface of the first latch configured to face the first latch recess is formed as a first inclined end;

one surface of the second latch configured to face the second latch recess is formed as a second inclined end; and the first inclined end and the second inclined end are formed with a designated inclination to form a V-shaped structure in which a distance between the first inclined end and the second inclined end becomes decreased in a direction of the main hinge, when restraint of the striker by the first and second latches is released and thus the first and second latches are rotated about the main hinge due to elastic force of the first and second elastic bodies.

9. The seatback restraint device of claim 7, wherein:

the first latch is provided with a stopper protrusion configured to contact one side of the second latch; and the second latch is provided with a locking protrusion configured such that the stopper protrusion comes into contact with and is supported by the locking protrusion when the first latch is rotated about the main hinge by elastic force of the first elastic body.

10. The seatback restraint device of claim 1, wherein:

the first latch is provided with a stopper protrusion configured to contact one side of the second latch; and the second latch is provided with a locking protrusion configured such that the stopper protrusion comes into contact with and is supported by the locking protrusion when the first latch is rotated about the main hinge by elastic force of the first elastic body.

11. The seatback restraint device of claim 1, wherein the operating cable comprises a connector rotatably connected to the first latch or the second latch, and a hollow guide tube rotatably connected to the second latch or the first latch.

12. The seatback restraint device of claim 11, wherein the operating cable further comprises a cable rod having one end fixed to the connector via the guide tube and another end connected to a restraint release lever.

13. The seatback restraint device of claim 1, wherein, in a case that an inclination angle of the seatback frame changes as a position of a seat cushion changes, when the striker comes into contact with a first inclined end of the first latch or a second inclined end of the second latch, the first and second latches, the first elastic body and the operating cable are simultaneously rotated to enable insertion of the striker, and when the operating cable is operated, the first latch and the second latch are relatively mutually operated at any position to enable release of restraint of the striker.

14. A vehicle seat comprising the seatback restraint device of claim 1.

15. A vehicle comprising the seatback restraint device of claim 1.

16. A seatback restraint device for a vehicle, comprising:

a first latch provided with a first latch recess, wherein a striker of a vehicle body is configured to be inserted into the first latch recess;

a second latch provided with a second latch recess, wherein the striker is configured to be inserted into the second latch recess;

a main hinge configured to penetrate the first and second latches so as to enable rotation and a scissoring operation of the first latch and the second latch; and an operating cable directly connected to and supported by the first latch and the second latch, wherein the first and second latches are operated relative to each other by the operating cable, wherein the second latch recess of the second latch is formed so that one side of the second latch recess is open toward the striker when a seatback frame is rotated in a direction of the striker, and wherein the first latch recess of the first latch is formed so that one side of the first latch recess is open in a direction perpendicular to an opening direction of the second latch.

17. The seatback restraint device of claim 16, further comprising a fixing bracket operably connected to the main hinge to enable the scissoring operation of the first and second latches.

18. The seatback restraint device of claim 17, further comprising a first elastic body having first and second ends.

19. The seatback restraint device of claim 18, wherein the first and second ends of the first elastic body are connected to and supported by at least one end of the first latch or one end of the second latch.

20. A vehicle comprising the seatback restraint device of claim 16.

* * * * *